United States Patent [19]

Yount

[11] Patent Number: 4,787,041
[45] Date of Patent: Nov. 22, 1988

[54] DATA CONTROL SYSTEM FOR DIGITAL AUTOMATIC FLIGHT CONTROL SYSTEM CHANNEL WITH PLURAL DISSIMILAR DATA PROCESSING

[75] Inventor: Larry J. Yount, Scottsdale, Ariz.

[73] Assignee: Honeywell, Minneapolis, Minn.

[21] Appl. No.: 761,455

[22] Filed: Aug. 1, 1985

[51] Int. Cl.⁴ .................. G06F 15/16; G06F 15/50
[52] U.S. Cl. .................. 364/424.03; 364/131; 364/200; 364/424.06
[58] Field of Search .............. 364/426, 200 MS File, 364/900 MS File, 439, 131; 371/9, 62, 68; 244/76 R

[56] References Cited

U.S. PATENT DOCUMENTS

| | | | |
|---|---|---|---|
| 4,032,757 | 6/1977 | Eccels | 371/68 |
| 4,115,847 | 9/1978 | Osder et al. | 364/186 |
| 4,130,241 | 12/1978 | Meredith et al. | 371/68 |
| 4,276,593 | 6/1981 | Hansen | 371/9 X |
| 4,276,594 | 6/1981 | Morley | 364/200 |
| 4,327,437 | 4/1982 | Gelderloos | 371/68 |
| 4,503,534 | 3/1985 | Budde et al. | 371/9 |
| 4,644,538 | 2/1987 | Copper et al. | 371/68 X |

Primary Examiner—Parshotam S. Lall
Assistant Examiner—Thomas G. Black
Attorney, Agent, or Firm—Seymour Levine; Albin Medved

[57] ABSTRACT

A direct memory access (DMA) system with a single bus architecture for controlling data transfers and storage between plural digital processors and plural Input/Output devices. Limiters are included for disabling access to the bus of a processor whose access time exceeds a predetermined time interval. A time governor is included to suppress processor access to the bus when total processor access time in a data communication cycle has exceeded a predetermined time interval. The input and output devices are coupled to the bus through interface isolation circuits that prevent faults in the input and output devices from propagating to the system to cause total system failure. An input or output device fault can only result in erroneous data being provided to a location of the DMA memory reserved for the faulted device. The DMA memory is protected by a Write-Protect Decoding Circuit that prevents processor writing into prohibited areas of the memory.

18 Claims, 5 Drawing Sheets

DATA CONTROL SYSTEM FOR DIGITAL AUTOMATIC FLIGHT CONTROL SYSTEM CHANNEL WITH PLURAL DISSIMILAR DATA PROCESSING

BACKGROUND OF THE INVENTION

1. Field of the Invention

The invention relates to automatic flight control systems particularly with respect to redundant dissimilar digital data processing.

2. Description of the Prior Art

Automatic flight control systems are constrained by Federal Air Regulations to provide safe control of the aircraft throughout the regimes in which the automatic flight control system is utilized. Any failure condition which prevents continued safe flight and landing must be extremely improbable. Present day regulations require a probability of less than $10^{-9}$ failures per hour for flight critical components. A flight critical portion of an automatic flight control system is one the failure of which will endanger the lives of the persons aboard the aircraft. For example, components of an automatic flight control system utilized in automatically landing the aircraft may be designated as flight critical, whereas, certain components utilized during cruise control may be designated as non-critical. The safety level of the components of the system is determined by analysis and testing procedures familiar to those skilled in the art.

Automatic flight control systems utilizing analog computers and components had been prevalent in the art, wherein such systems utilized independent control of the aircraft axes. Traditionally, such systems utilized independent pitch and roll control channels. With such systems, it was completely practical to perform the analysis to certify conformance to the safety requirements of the Federal Air Regulations. Such certification was facilitated by the axis independent control.

A known technique for enhancing automatic flight control system reliability is that of dual redundancy. Dual redundancy is the utilization of two identical channels with cross channel monitoring to detect a failure in one of the channels. Although such systems are effective against random faults which effect only one channel, cross-channel monitoring does not provide effective detection of generic faults. A generic fault is defined as a fault that is inadvertently designed into a component such that all components generically have this fault and respond in a defective manner. When identical components having a generic fault are in respective redundant channels, the cross-channel monitoring detects the same although erroneous output from both channels and, therefore, does not detect the error. In order to satisfy the Federal Air Regulations in the prior art, the absence of generic faults was proven by analysis and testing to the required level. Generic faults are also denoted as design errors.

In the present day technology, stored program digital computers are supplanting the analog computer of the prior art technology. It has generally been found that a digital computer including the hardware and software is of such complexity that the analysis for certification in accordance with Federal Air Regulations is exceedingly more time consuming, expensive and difficult than with the analog computer. The level of complexity and sophistication of the digital technology is increasing to the point where analysis and proof for certification to the stringent safety requirements is approaching impossibility. To further exacerbate the difficulty, current day digital flight control computers perform all of the computations for all of the control axes of the aircraft in the same computer unlike in the analog computer approach where the control of the aircraft axes was provided by separate respective channels.

Additionally, in the design of a digital flight control system channel, it is desirable to utilize a single bus in a multiplexed fashion for interfacing the digital computer with the plurality of input devices that provide data to the computer, as well as with the plurality of output devices to which the computer provides signals. It is appreciated that a channel can have one or more active computers associated therewith coupled to and communicating via the single bus. A single bus architecture is simpler in hardware configuration, less bulky, and lighter weight than, for example, a dedicated parallel bus architecture, which qualities are significant for efficacious utilization in present day aircraft.

For the reasons given above, as is well appreciated in the art, redundant identical channels of digital data processing may be utilized responsive to respective separate sensor sets to enhance the safe performance of the system. As explained above, generic faults are not readily detectable by cross-monitoring of the identical channels. With the increasingly complex and sophisticated digital processing being incorporated into automatic flight control systems, it is approaching impossibility to prove by analysis the absence of generic faults to the levels required by the Federal Air Regulations. It is appreciated that in a digital flight control channel, including a ditial computer, sensors and Input/Output (I/O) apparatus, all of the processing for all aircraft axes are performed in the same computer and critical as well as non-critical functions are controlled by the channel. Thus, the entire channel must be certified in accordance with the "extremely improbable" rule discussed above with respect to flight critical aspects of the system. Thus, even those portions of the system utilized for performing noncritical functions, must be certified to the same level as the critical portions since the non-critical portions are within the same computation complex as the critical portions.

In order to overcome these problems, the automatic flight control technology has only recently advanced to the concept of dissimilar redundancy. In dissimilar redundancy, as currently utilized, two or more channels are provided with identical respective sensor sets utilizing, however, dissimilar data processing in one channel with respect to a redundant channel to perform identical functions. This is achieved either by dissimilar computers with respect to the hardware thereof, or by dissimilar software in the redundant computers or by both dissimilar hardware and dissimilar software. With this approach, a generic fault designed into the computer of one channel will not exist in the computer of the other channel and cross-channel monitoring will detect the discrepancy between the channels caused by the fault, the fault being in either hardware or software. The remainder of the channels may then be readily analyzed to the safety levels required by the Federal Air Regulations. The dissimilar computation apparatus, however, need not be subject to the analysis that, as described above, is currently approaching impossibility.

In the prior art utilizing dissimilar redundancy, each channel of the automatic flight control system included one digital processor and the system included cross channel monitoring to detect discrepancies between the channels. Each channel can also include plural active processors with cross processor monitoring to detect generic faults and design errors with respect to the processor hardware and software. Such an architecture, however, engenders problems which are further exacerbated when utilizing a single bus channel. For example, although cross computer monitoring can detect generic faults in the hardware or software of either processor because of the dissimilar data processing implemented with respect to the computers, one of the computers can contaminate the data of the other computer thereby preventing detection of the generic faults. Additionally, in a plural computer channel utilizing a centralized data handling system, a faulted central processor unit (CPU) can monopolize the system thereby causing total cessation of functionality. In a similar manner, the plural CPUs can monopolize the system to the exclusion of the Input/Output devices during the I/O cycles of the system. This problem is particularly severe in a single bus architecture where the faulted CPU monopolizes the bus to the exclusion of the other CPUs and the Input/Output devices. A further problem engendered by the single bus architecture is that a failure in an Input/Output device can reflect onto the bus in a manner as to cause total bus failure. Thus since failure of a noncritical Input/Output device could result in total failure of the critical functionality of the system, the prior art required that the non-critical I/O devices be analyzed to the same stringent safety level as the critical I/O devices.

SUMMARY OF THE INVENTION.

The present invention comprises a channel of a digital automatic flight control system. The channel includes a set of Input devices, a set of Output devices, first and second digital processors (CPUs) and a data handling system for providing communication between the I/O devices and the processors as well as between the I/O devices and the channel. The channel includes a limiter that terminates the access of a CPU to the data handling system after a predetermined occupancy time has elapsed. Preferably, a time governor is also included that terminates CPU access to the data handling system when the total CPU time utilized has exceeded a predetermined portion of the I/O data transfer cycle. Preferably, the channel utilizes a single I/O bus architecture multiplexed with respect to the processors and the I/O devices.

In a preferred embodiment of the invention, an I/O interface circuit is utilized to couple each I/O device to the bus so as to prevent an I/O device fault from being propagated onto the bus so as to cause total bus failure.

In the preferred embodiment of the invention, the data handling portion of the channel comprises a Direct Memory Access (DMA) architecture for effecting the transfer of data, addresses, control signals and the like, among the I/O devices and the CPUs. In order to assure independent access of data to the two processors, separate respective memories are provided associated with each CPU into which the same data is written for independent access by the respective CPUs. Means are included to prevent each CPU from writing into the memory associated with the other processor.

In the preferred embodiment of the invention, the first and second digital processors provide dissimilar data processing with respect to each other. The CPUs may be hardware dissimilar, software dissimilar, or both hardware and software dissimilar. The first and second processors provide redundant functionality with respect to each other, at least with respect to the critical automatic flight control system functions performed thereby.

Thus, it is appreciated that the present invention provides isolation of the plural processors relative to the I/O memory and control system and also provides a fault boundary with respect to the I/O devices.

DESCRIPTION OF THE PREFERRED EMBODIMENT

Figure 1:
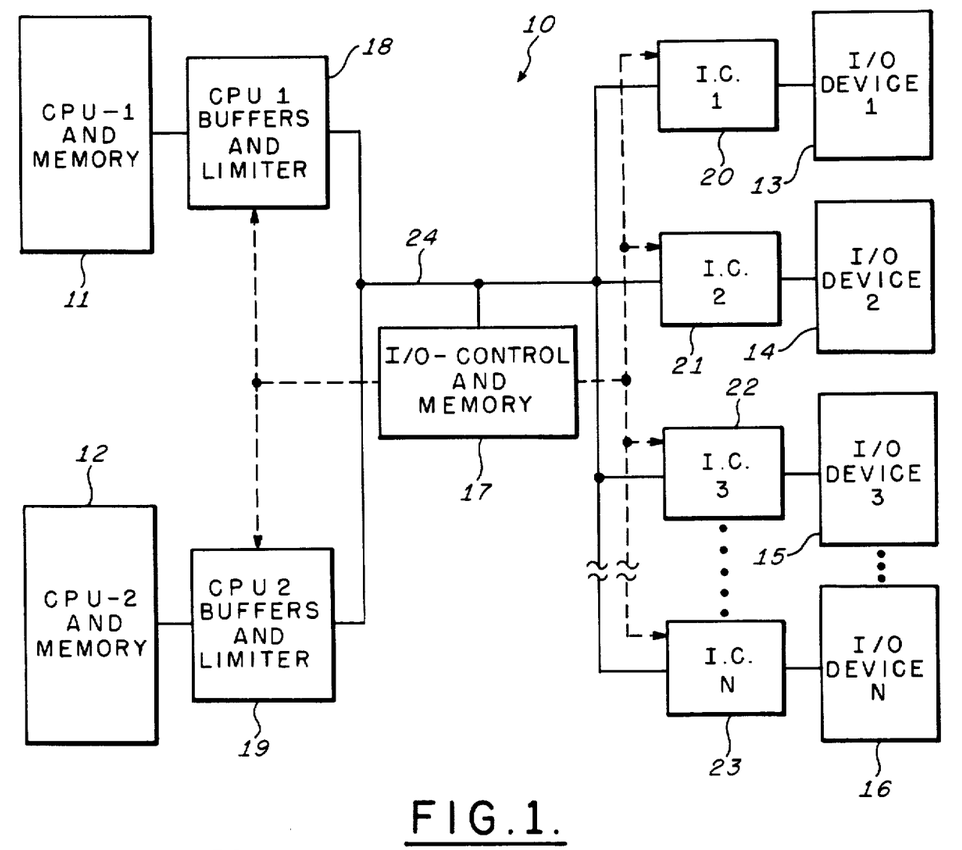
FIG. 1 is a schematic block diagram of a channel of an automatic flight control system having two processors in the channel and a plurality of I/O devices.

Referring to FIG. 1, a channel 10 of an automatic flight control system is illustrated. The channel 10 includes a plurality of digital data processing units and is illustrated with two units 11 and 12 for purposes of description. Each of the processing units 11 and 12 includes a central processing unit (CPU) and a memory. The channel 10 also includes a plurality of Input/Output (I/O) devices illustrated at reference numerals 13-16. The I/O devices 13-16 include all of the devices in the aircraft that provide data to and receive data from the channel 10. The I/O devices 13-16 include flight condition sensors such as gyroscopes, accelerators, air data computers as well as control surface sensors, discrete signals and the like for providing data to the channel 10. The I/O devices 13-16 also include such output devices as control surface servos, indicators, displays, discretes and the like for receiving data from the channel 10. It is appreciated that the I/O devices 13-16 include Input and Output processing for converting the signals provided by the input devices into digital format for processing within the channel 10 and for converting the digital signals provided by the channel 10 into formats suitable for use in the output devices. Such Input and Output conversion includes parallel-to-serial and serial-to-parallel convertors, analog-to-digital and digital-to-analog convertors, synchro-to-digital and digital-to-synchro convertors, and the like.

The architecture of the channel 10 is preferably of the direct memory access (DMA) type. The DMA data control system of the channel 10 includes I/O - control and memory 17 which communicates with the processors 11 and 12 as well as with the I/O devices 13-16. The I/O - control and memory 17 communicates with processors 11 and 12 via buffers 18 and 19 respectively. Associated with the processors 11 and 12 are respective limiters schematically represented within the respective blocks 18 and 19. The structure and function of the limiters will be described herein below.

The I/O devices 13-16 communicate with the I/O controller 17 via respective isolation circuits 20-23. In a manner to be described, each of the isolation circuits 20-23 creates a fault boundary between the I/O device with which it is associated and the remainder of the system. All data transmitted to or by an I/O device is propogated through the associated isolation circuit. In a manner to be explained, no failure of an I/O device can propogate through the associated integrated circuit so as to cause total system failure. The isolation circuits 20-23 provide the interface and function as buffers between the I/O controller 17 and the I/O devices 13-16.

The I/O devices 13-16, the processors 11 and 12 and the I/O controller 17 are interconnected by a bus 24. The bus 24 is a high-capacity parallel digital structure for conveying data, addresses and control signals. Each of the isolation circuits 20-23 adheres to the interface protocol of the bus 24 and each of the I/O devices 13-16 seeking access to the DMA memory 17 via the bus 24 satisfies the bus interface protocol. This standardized communication protocol enhances system growth and architectural flexibility. The I/O devices 13-16 are sequentially polled and offered servicing by the DMA control unit 17 via the bus 24. The data flow among the processors 11 and 12, the DMA controller 17 and the I/O devices 13-16 is schematically depicted by the solid line bus 24. The control of the buffers and limiters 18 and 19 as well as the isolation circuits 20-23 by the DMA controller 17 is schematically depicted by the dashed control lines illustrated.

In a manner to be described, data from an input device may be inputted into the DMA memory 17 which thereafter outputs the data to another I/O device. In this manner, data may be interchanged among the I/O devices 13-16 independent of contamination from the processors 11 and 12. In a manner to be described, the I/O memory 17 is protected from contamination by the processors 11 and 12 by utilizing a write protection capability to be described. Accordingly the I/O control system 17 can function as a data concentrator, independent of contamination from the processors 11 and 12.

Figure 2A:
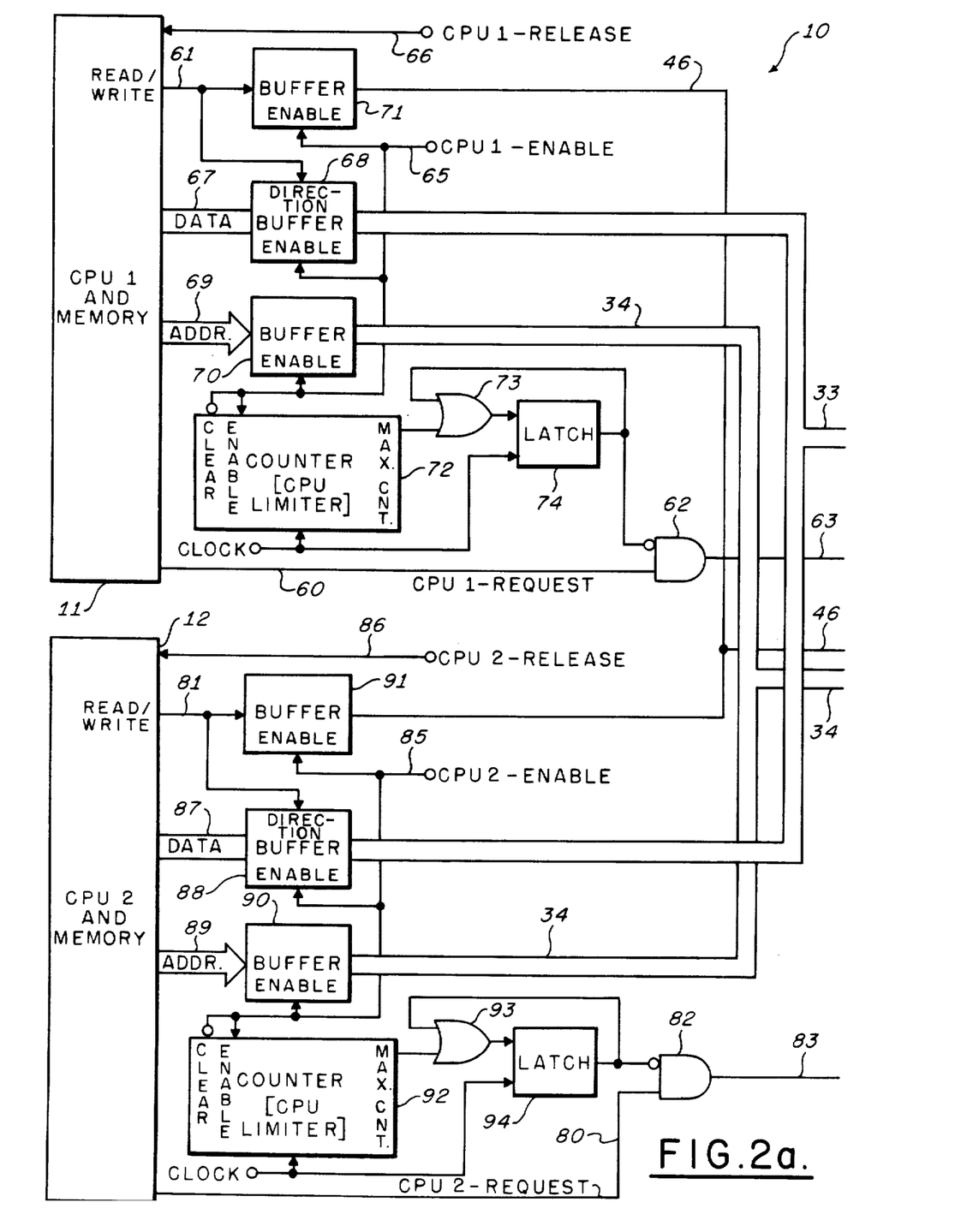
FIGS. 2a, 2b and 2c show a schematic block diagram illustrating in detail the channel of FIG. 1.
Figure 2B:
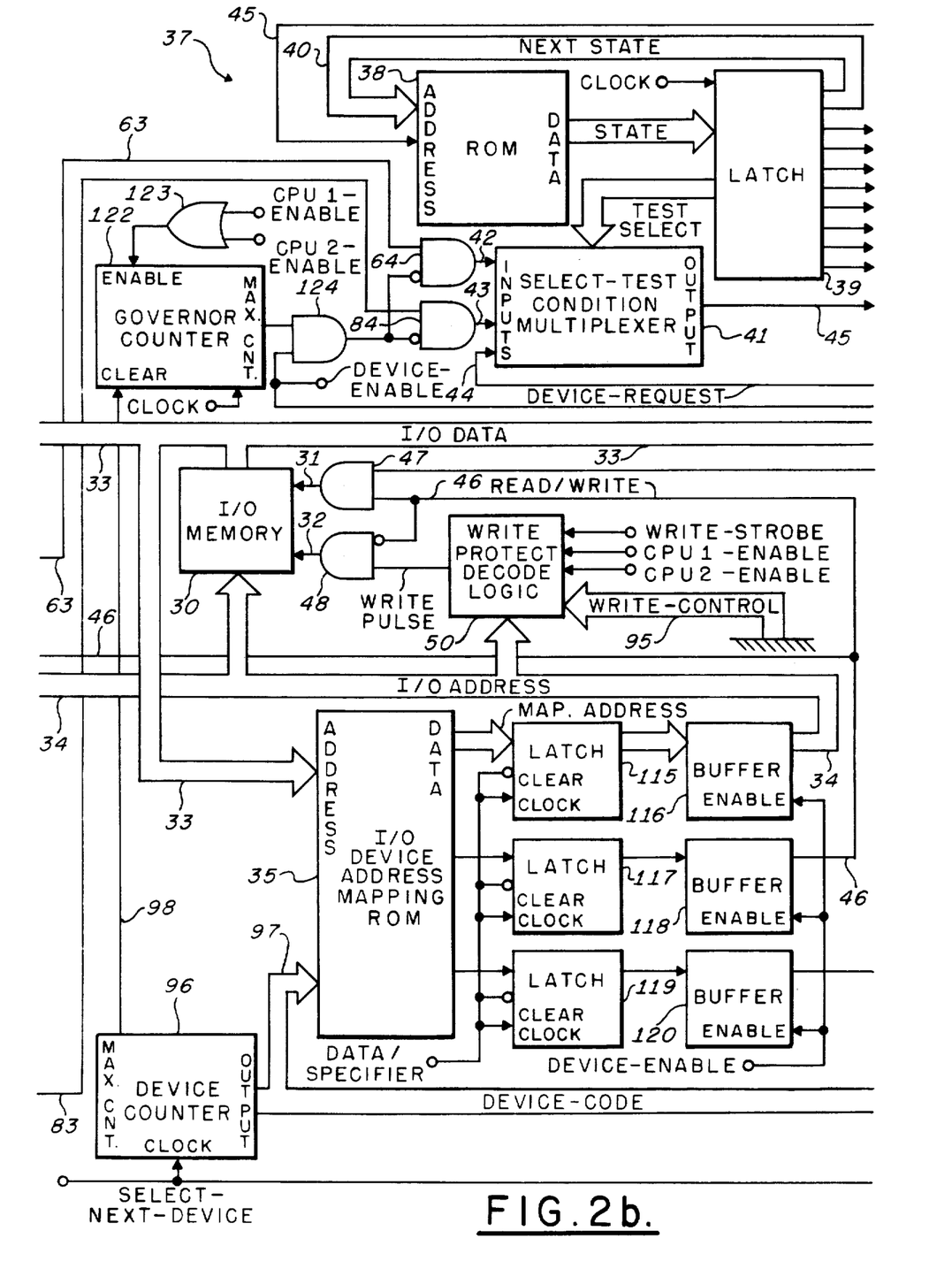
Figure 2C:
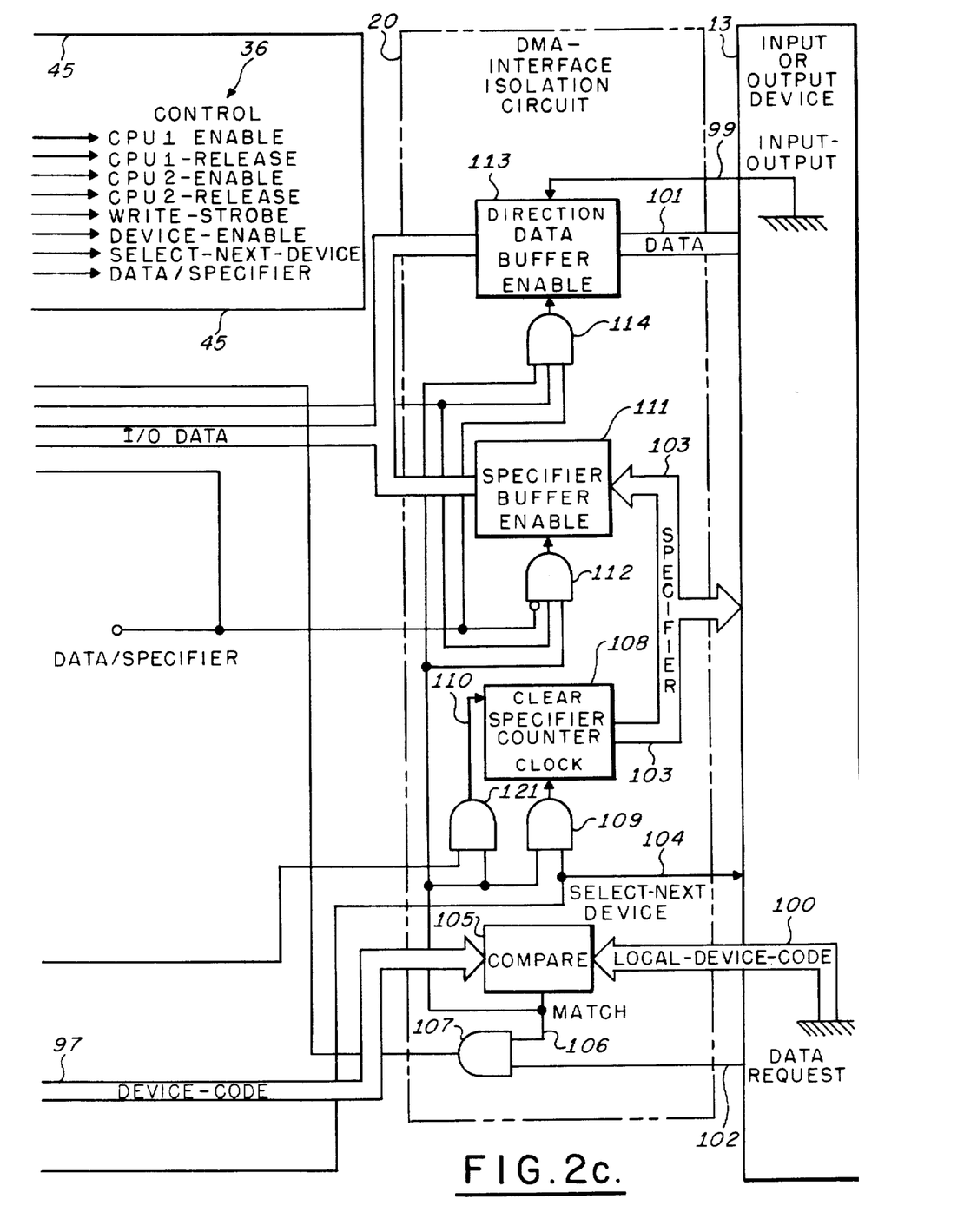

Referring to FIG. 2, a schematic block diagram of the channel 10 of FIG. 1 is illustrated showing further details thereof. Like reference numerals indicate like elements with respect to FIG. 1. As described above with respect to FIG. 1, the channel 10 includes the processors 11 and 12 each of which includes a CPU and memory. The channel 10 communicates with a plurality of I/O devices through respective isolation circuits, one such I/O device being illustrated at 13 with its associated isolation circuit at 20. Additional I/O devices and isolation circuits are coupled in parallel to the channel 10 in the manner illustrated in FIG. 1. Preferably, the processors 11 and 12 provide dissimilar data processing with respect to each other. Such dissimilar data processing may be effected either by dissimilar hardware, dissimilar software, or by both dissimilar hardware and dissimilar software.

The processors 11 and 12 may be implemented by the SDP 175-2 and the SDP 275 Computers, respectively, which are manufactured and are available from the assignee of the present invention. These computers are designed by the present assignee for airborne applications. The SDP 175-2 microprocessor was designed and developed by the present assignee and the SDP 275 is based on the Z8002 microprocessor. Each of these computer types has its own distinct assembler.

Central to the I/O controller of the system 10 is an I/O memory 30, which is preferably implemented as a random access memory (RAM). The memory 30 is configured for reading by the application of a logical High or binary ONE control signal to the memory 30 on a line 31 and is configured for writing by a logical Low signal or binary ZERO on the line 31. In order to write into the memory 30, a Write Pulse must also be applied to the memory 30 on a line 32 to strobe the data into the memory. The memory 30 transmits data to and receives data directly from the processors 11 and 12 as well as directly to and from the I/O devices such as the device 13 via an I/O data bus 33. The memory 30 is addressed via address signals on an I/O address bus 34. The processors 11 and 12 provide address signals to the address bus 34 when communicating with the memory 30 and addresses for communication with the I/O devices are provided via the bus 34 by an I/O Device Address Mapping Read Only Memory (ROM) 35 in a manner to be described. The busses 33 and 34 are preferably high speed parallel busses and it is appreciated that the bus 24 of FIG. 1 is schematically representative of the I/O data bus 33 and the I/O address bus 34 of FIG. 2. This direct access of the memory 30 by the I/O devices such as the device 13 is traditionally denoted as Direct Memory Access (DMA). In a manner to be described, the I/O data bus 33 is also utilized to convey specifiers denoting items of data transferred to and from the I/O devices.

The DMA controller illustrated in FIG. 2 utilizes a plurality of control signals delineated at 36. The control signals are denoted as CPU 1-Enable; CPU 1-Release; CPU 2-Enable; CPU 2-Release; Write-strobe; Device-Enable; Select-Next-Device; and Data/Specifier. The control signals 36 are provided to the various elements of the automatic flight control system channel 10 as illustrated in the figure for reasons to be described. The signals 36 are generated by a control sequencer 37 which is implemented as a sequential state machine. The sequencer 37 is comprised of a ROM 38 that stores a plurality of data words corresponding to the machine states, respectively, each word containing the data for the control signals 36 for the associated state as well as an address within the ROM 38 that contains the data word for the next state. The ROM 38 provides a data word to a latch assembly 39 in accordance with the address signals applied to the address port of the ROM 38. In response to a clock signal, the current state data word is strobed into the latch assembly 39 for application to the output thereof where it is made available to the various components of the channel 10. The next state address field of the current state data word, held in the latch assembly 39, is applied to the address port of the ROM 38 via a bus 40 for controlling sequencing to the next state in response to the clock signal.

The control sequencer 37 also includes a Select-Test Condition multiplexer 41 that varies the sequence of states occupied by the sequencer 37 in accordance with test conditions. Three test condition signals are applied to the inputs of the multiplexer 41 via lines 42, 43, and 44 in accordance with a DMA request from the processor 11, a DMA request from the processor 12 and a DMA request from an I/O device, respectively, in a manner to be described. The three test condition signals are denoted as CPU 1-Request; CPU 2-Request; and Device-Request; respectively. The multiplexer 41 selects one of the inputs for application to its output in accordance with a Test-Select signal from the latch assembly 39. The Test-Select signal is provided by a field in the data word from the ROM 38 associated with a state from which a sequence variation is to be controlled. The output from the multiplexer 41 is provided via a line 45 to the address port of the ROM 38 so as to affect the selection of the address for the next state in accordance with the selected test condition signal. In this manner, the sequencer 37 may be controlled by the three test conditions to effect conditional branches in the sequence of states occupied by the sequential state machine 37. Thus, it is appreciated that each state occupied by the sequencer 37 defines the address for the ROM 38 of the next state, which address can be varied by a selected test condition as described. The sequence of states and state branches effected by the control sequencer 37 will be discussed in detail with respect to FIG. 4.

The reading or writing status of the memory 30 is determined by a Read/Write signal on a Read/Write control line 46. The Read/Write signal on the line 46, in controlling the memory 30, is applied as an input to an AND gate 47 and also to the inverting input of an AND gate 48. The outputs of the AND gates 47 and 48 provide the previously described memory controlling signals on the lines 31 and 32, respectively. The Data/-Specifier control signal from the control sequencer 37 is applied as a second input to the AND gate 47. The Write Pulse for strobing data into the memory 30 during a writing operation is provided to a second input of the AND gate 48 from a Write Protect Decode logic circuit 50 to be described. When data is to be transferred via the data bus 33, the Data/Specifier signal is in a logically High state. When specifier information is to be transferred via the data bus 33, the Data/Specifier signal is in a logically Low state. When a reading operation is to be controlled, the Read/Write signal is in a logically High state and when a writing operation is to be controlled, the Read/Write signal is in a logically Low state. Thus, when the Data/Specifier signal is Low, the AND gate 47 is disabled, placing a Low signal on the line 31. A Low signal on the line 31, as previously described, configures the I/O memory 30 for writing but when a specifier is placed on the data bus 33, no Write Pulse is provided to the AND gate 48 and, therefore, the memory 30 is not activated.

When, however, data transactions are to be performed, the Data/Specifier signal is High permitting the Read/Write signal to control the state of the AND gate 47 and hence the state of the line 31. When the Data/Specifier signal is High and the Read/Write signal is also High, the AND gate 47 is enabled, placing a High signal on the line 31, thus configuring the memory 30 for reading. The High Read/Write signal also disables the AND gate 48 so that Write Pulses are not applied to the line 32. During a writing operation, the Read/Write signal, being Low, disables the AND gate 47 and enables the AND gate 48, thus configuring the I/O memory 30 for writing and permitting Write Pulses to pass through the gate 48 to strobe data into the memory 30.

Figure 3:
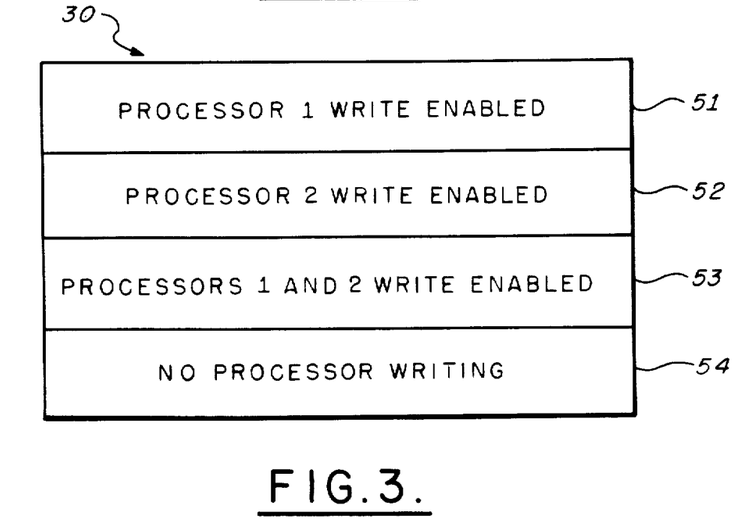
FIG. 3 is a memory map of the I/O memory of FIG. 2.

Referring for the moment to FIG. 3, a memory map of the I/O memory 30 of FIG. 2 is illustrated. The memory 30 is organized into four separate blocks or sections designated as Processor 1 Write Enabled; Processor 2 Write Enabled; Processors 1 and 2 Write Enabled; and No Processor Writing. The four sections of the memory 30 are identified by reference numerals 51-54 respectively. The memory 30 is logically partitioned in a manner to be described such that the processor 12 of FIG. 2 cannot write into the block 51 and the processor 11 of FIG. 2 cannot write into the block 52. Additionally, both of the processors 11 and 12 can write into the block 53 whereas neither of the processors 11 and 12 can write into the block 54. Each of the processors 11 and 12 can, however, read from any area of the memory 30. Reading and writing data to and from the I/O devices, such as the device 13, is not restricted with respect to the partitioning of the memory 30. The blocks 51-54 of the memory 30 may be implemented by four physically distinct memories.

As discussed above, the I/O devices can communicate with the I/O controller independently of the processors 11 and 12. Preferably, the block 54, into which neither of the processors write, is utilized for this purpose.

Referring again to FIG. 2, the processor 11 communicates with the I/O memory 30 via the data bus 33 and the address bus 34 for writing data into the memory 30 and for reading data therefrom. The processor 11 initiates a data transaction by issuing a CPU 1-Request signal on a line 60 and provides a Read/Write signal on a line 61 representative of the type of data transaction requested. The CPU 1-Request signal on the line 60 is transmitted as a test condition signal input to the multiplexer 41 on the multiplexer input 42 via an ANd gate 62, a line 63 and a further AND gate 64. The second input to each of the AND gates 62 and 64 is a normally enabling signal that permits the CPU 1-Request signal issued by the processor 11 to propogate to the input 42 of the multiplexer 41. In response to the CPU 1-Request signal applied to the input 42 of the multiplexer 42, the control sequencer 37, in a manner to be further described below, sequences through a series of states that turn off the Device-Enable signal, issue the CPU 1-Enable signal, set the Data/Specifier signal to the data state, issue the Write-Strobe, issue thereafter the CPU 1-Release signal and then cause the control sequencer 37 to wait for the processor 11 to remove its CPU 1-Request signal. The CPU 1-Enable signal and the CPU 1-Release signal are applied from the latch assembly 39 to lines 65 and 66, respectively, as indicated by the legends.

The processor 11 communicates with the I/O data bus 33 via an I/O port 67 and a buffer 68 and with the I/O address bus 34 via an I/O port 69 and a buffer 70. The Read/Write control signal issued by the processor 11 on the line 61 is placed on the I/O Read/Write control line 46 via a buffer 71. In response to the CPU 1-Request signal issued by the processor 11 to the control sequencer 37, the control sequencer 37 issues the CPU 1-Enable signal to the processor 11. The CPU 1-Enable signal is applied via the line 65 to enable the buffers 68, 70 and 71 thereby coupling the data I/O port 67 of the processor 11 to the I/O data bus 33; the address I/O port 69 of the processor 11 to the I/O address bus 34 and the CPU 1-Read/Write signal on the line 61 to the I/O Read/Write control line 46. The Read/Write control signal on the line 61 is also applied to the data buffer 68 to control the direction of data flow therethrough.

Thus, access of the processor 11 to the I/O memory 30 is initiated by the CPU 1-Request signal and the DMA controller acknowledges the request by issuing the CPU 1-Enable signal. The DMA controller also sets the Data/Specifier signal to the data mode and issues the Write-Strobe. The enabled processor 11 responds by addressing a specific location in the memory 30 while controlling the reading and writing status of the memory via the Read/Write control signal on the line 61. For a reading operation, the AND gate 48 is disabled and a Write-Pulse resulting from the Write-Strobe control signal does not propagate therethrough. For a Writing operation, the gate 48 is enabled and a Write- Pulse resulting from the Write-Strobe control signal propagates therethrough to the memory 30. Thus, when enabled, the processor 11 addresses the memory 30 for reading data from the addressed location or writing data therein. After issuance of the Write-Strobe signal, the control sequencer 37 issues the CPU 1-Release signal to the processor 11 via the line 66 indicating to the processor 11 that the data transaction has been completed. With respect to a reading operation, the CPU 1-Release signal designates that valid data appears on the I/O data bus 33 and the response of the processor 11 is to remove the CPU 1-Request signal from the line 60 after strobing the data into the processor 11 memory. With respect to a writing operation, the CPU 1-Release signal indicates that the data provided by the processor 11 for writing into the I/O memory 30 has been written therein. The processor 11 response is to immediately remove the CPU 1-Request signal from the line 60.

After the control sequencer 37 issues the CPU 1-Release signal, the DMA controller examines the CPU 1-Request line to determine when the CPU 1-Request signal is removed. Upon removal of the Request signal, the control sequencer 37 advances to the next state wherein the CPU 1-Enable signal is removed and the DMA controller advances to the next required data transaction. If, however, a fault in the processor 11 results in the CPU 1-Request signal remaining on after the Release signal is received, the DMA controller would be locked into a continuous waiting condition, thereby disrupting all activity associated with the I/O memory. Thus, a fault in the processor 11 could disrupt the activities of the processor 12 and the I/O devices by preventing access to the I/O memory 30.

In order to protect against the processor 11 monopolizing the I/O data control system of FIG. 2, a CPU Limiter Counter 72 is utilized. When the CPU 1-Enable signal on the line 65 is off, the counter 72 is cleared or preset to a count corresponding to an interval of time slightly greater than the maximum time between the CPU 1-Enable signal becoming active and the CPU 1-Request signal being removed. When the CPU 1-Enable signal on the line 65 becomes active, the counter 72 begins counting. During normal operation, the CPU 1-Request signal will be removed by the processor 11 prior to the counter 72 attaining its maximum count. When the CPU 1-Request signal is removed, the control sequencer 37 removes the CPU 1-Enable signal thereby clearing the counter 72 to its preset state. A fault in the processor 11 that prevents the CPU 1-Request signal from being removed after the CPU 1-Release signal is received, will result in the CPU 1-Enable signal remaining on. Under this faulted condition, the counter 72 attains its maximum count.

The maximum count output from the counter 72 is applied as an input to an OR gate 73. The output of the OR gate 73 is applied to a fault latch 74 whose output is applied as an inverting input to the AND gate 62 and as a second input to the OR gate 73. During normal operation, the maximum count output from the counter 72 is Low which causes the latch 74 to provide a Low output. The Low output being inverted enables the AND gate 62 to permit the CPU 1-Request signal on the line 60 to propagate therethrough. The Low output from the latch 74 applied to the OR gate 73 maintains the latch output in the Low state. If, however, the counter 72 attains maximum count, the maximum count output goes High which sets the latch into a permanent High state disabling the AND gate 62. Under this condition, the CPU 1-Request signal on the line 60 is effectively removed from application to the control sequencer 37 and further data access requests from the processor 11 are blocked. Thus, if excessive time is expended by the DMA-Control System of FIG. 2 in servicing a request of the processor 11 for data access, the counter 72 attains its maximum count and a faulted processor is indicated. The faulted processor is thereafter blocked from further requests to the DMA controller.

The interface of the processor 12 with the DMA controller is identical to that of the processor 11. Thus components 80–94 are structurally and functionally identical to the components 60–74, respectively, described above with respect to the processor 11. It is therefore appreciated that if either the processor 11 or the processor 12 is faulted whereby it does not remove its Request signal after receiving the Release signal, the appropriate fault latch 74 or 79 is set thereby permanently removing the faulted processor from any further DMA controller data transaction requests.

As discussed above, in order for cross processor monitoring to be effective, each of the processors 11 and 12 must be isolated with respect to each other and with respect to the common data sources in order that contamination or interference with the data for one processor by the other processor is prevented. The partitioning of the I/O memory 30, as discussed above with respect to FIG. 3, and the Write Protect Decode Logic 50 are utilized to assure that the processors 11 and 12 are independent and have independent access to the data. The Write Protect Decode Logic 50 only has effect during processor access to the memory 30. For this purpose, the CPU 1-Enable and CPU 2-Enable signals from the control sequencer 37 are applied to the logic 50 so that the logic 50 has no effect for I/O access to the memory 30. Thus, the logic 50 is only effective when either the CPU 1-Enable signal or the CPU 2-Enable signal is on. Additionally, the memory partitioning is only utilized for processor 11 and processor 12 writing operations.

The I/O address on the address bus 34 is applied as an input to the Write Protect Decode Logic 50. The logic 50 decodes the significant bits of the I/O address to determine which quadrant of the I/O memory 30 is being accessed. The logic 50 includes a Write/Control specification 95 that determines eight conditions corresponding to the permission of each of the processors 11 and 12 to write into each of the four quadrants of the I/O memory 30. The Write-Control specification 95 is hardwired to the equipment chassis connector for reliability as indicated by the symbol illustrated with the Write-Control specification 95. The Write-Strobe signal from the control sequencer 37 is applied as an input to the logic 50. In a manner to be further described herein below, the Write-Strobe signal is provided by the control sequencer 37 during both processor and I/O device access to the I/O memory 30. When the CPU 1-Enable and CPU 2-Enable signals are both off (Device-Enable is on) the logic 50 unconditionally issues the Write-Pulse in response to the Write-Strobe signal. When either the CPU 1-Enable or the CPU 2-Enable signal is on and the address on the address bus 34 is accessing a proper quadrant of the memory 30, the Write-Pulse is issued in response to the Write-Strobe signal. If, however, either the processor 11 or the processor 12 attempts to write into a nonassigned address, the Write-Protect Decode Logic 50 does not issue the Write-Pulse in response to the Write-Strobe signal. The logic 50 examines the processor number and the address and inhibits the Write-Pulse if an inproper processor write is about to occur. In this manner, the Write-Protect Decode Logic 50 logically partitions the memory 30 into the separate quadrants illustrated and discussed above with respect to FIG. 3.

In order to further insure independent access of sensor data by independent processors, certain of the individual items of I/O device input data are simultaneously written into two locations in the memory 30 in respective quadrants thereof for independent access by the processors 11 and 12. Preferably, the data is written twice into respective quadrants 51 and 54 or, alternatively, into respective quadrants 51 and 52 (FIG. 3).

Thus, it is appreciated that either of the processors 11 and 12 can read data from any location in the I/O memory 30. The ability, however, to write into the quadrants of the memory 30 is rigidly partitioned such that one processor cannot alter the data of the other processor at any time. Additionally, in order to ensure processor independence and isolation, input device data is simultaneously written into multiple memory areas, each dedicated to a different processor. This redundant writing of I/O data into the memory 30 facilitates access to the data by the multiple processors 11 and 12 and, in conjunction with the memory Write-Protect capability described with respect to the logic 50, provides data isolation between the processors 11 and 12.

The I/O controller includes a device counter 96 that is clocked by the Select-Next-Device signal from the control sequencer 37 for providing a sequence of device code signals on a device code bus 97. The device codes generated by the counter 96 are assigned to identify the respective I/O devices of the system such as the device 13. The device code signals on the bus 97 are applied to the DMA-interface isolation circuits of the system, such as the circuit 20, and to the address port of the I/O Device Address Mapping ROM 35 for reasons to be discussed. The control sequencer 37 periodically issues the Select-Next-Device control signal in a manner to be described such that the counter 96 is sequentially indexed through the series of device codes. In this manner, the individual I/O devices of the system are selected for data transfers with the memory 30 in a sequentially or circularly polled fashion. When the counter 96 attains its maximum count, a signal is provided on a line 98. Attainment of the maximum count by the counter 96 signifies that all of the I/O devices of the system have been polled for a data transfer opportunity with the memory 30.

Each of the I/O devices of the system, such as the device 13, is coupled to the I/O controller via an interface isolation circuit such as the circuit 20. Each of the I/O devices provides a signal on a line 99 designating whether the particular device is an input device or an output device. As indicated by the legend, the line 99 is hardwired, for reliability, to either the (+V) logic voltage supply or to chassis ground in accordance with whether the device 13 is an input or an output device. The device 13 also provides a hardwired local device code on a bus 100. The local device codes are dedicated to the particular I/O devices, respectively. The digits of the code are hardwired to the (+V) logic voltage supply or to ground in accordance with the code. The conductors of the bus 100 and the line 99 are brought out to the electrical connector to provide the hardwired data to the isolation circuit 20. The verification of the code carried by the bus 100 and the I/O information carried by the line 99 is readily accomplished.

The device 13 has a data port 101 for accepting data from the memory 30 via the isolation circuit 20 if the device 13 is an output device and for providing data to the I/o memory 30 via the isolation circuit 20 if the device 13 is an input device. The device 13 also provides a data request signal on a line 102 when the device 13 has data to transmit via its data port 101 for an input device and when the device 13 is ready to receive data via its data port 101 for an output device. The device 13 also receives a specifier signal at a port 103 from the isolation circuit 20. The specifier signal designates the items of data associated with the device 13. For an input device, the specifier signal designates the items of data that the device 13 provides and for an output device, the specifier signal designates the items of data received by the device. Additionally, the device 13 receives the Select-Next-Device signal at an input 104 for synchronization purposes. The Select-Next-Device signal indicates to the I/O device 13 that the next device is about to be polled.

As previously explained, each I/O device has an interface isolation circuit associated therewith for providing access for the device to the I/O memory 30. All of the isolation circuits are substantially the same. The details of the isolation circuits will be described with respect to the isolation circuit 20 of FIG. 2.

The isolation circuit 20 includes a comparator 105 that compares the local device code provided by the I/O device 13 on the bus 100 with the DMA device code on the bus 97 provided by the device counter 96. When the comparator 105 indicates that the system device code on the bus 97 matches the local device code on the bus 100, the interface isolation circuit 20 has been selected to determine if the I/O device 13 requires a data transaction at that time. The I/O device 13 has access to the I/O data bus 33 only during the time that its local device code on the bus 100 matches the device code on the bus 97 provided by the I/O controller.

When the comparator 105 detects a match between the codes, the comparator 105 provides a signal on a line 106 for enabling the isolation circuit 20. The match signal on the line 106 is also applied as an input to an AND gate 107. The match signal on the line 106 enables the AND gate 107 when the comparator 105 detects the matching codes. After being selected, the isolation circuit 20 indicates a data access request on the line 44 by transmitting the data request signal on the line 102 from the I/O device 13 through the enabled AND gate 107. Thus, when the I/O controller polls the I/O device 13 by issuing its device code on the bus 97, the I/O device 13 may have access to the I/O data bus 33, if it is requesting a data transaction via its data request signal on the line 102.

The interface isolation circuit 20 also includes a specifier counter 108 that provides a sequence of specifier codes to identify the respective data items provided by or to the I/O device 13. The counter 108 counts through the specifier codes in response to a clock signal provided from an AND gate 109 until cleared by a signal on a line 110 provided by the I/O Device Address Mapping ROM 35 in a manner to be explained. The AND gate 109 receives an input from the output 106 of the comparator 105 and is enabled when the local device code on the bus 100 matches the I/O controller device code on the bus 97. After the data transaction for the I/O device 13 is completed, the counter 108 is incremented by the Select-Next-Device control signal from the control sequencer 37 applied to the counter 108 through the enabled AND gate 109. The specifier code output from the counter 108 is applied to the I/O device 13 via the input port 103 to select the particular item of data to be received from or transmitted to the I/O memory 30.

The interface isolation circuit 20 also includes a specifier buffer 111 for conveying the specifier code from the counter 108 to the I/O data bus 33. The buffer 111 is enabled by an AND gate 112 which receives as an input the signal from the comparator 105. Thus, the buffer 111 is only enabled when the device code on the bus 97 matches the local device code on the bus 100. The second input to the AND gate 112 is provided by the Device-Enable signal from the control sequencer 37. The Device-Enable signal is active whenever a CPU 1 or CPU 2 data transaction is not in progress. Thus, the specifier buffer 111 is only enabled during those portions of the DMA data cycle devoted to I/O device transactions.

The Data/Specifier signal from the control sequencer 37 is applied to an inverting input of the AND gate 112. As previously described, when the Data/Specifier signal is in the specifier mode, the signal is Low thereby enabling the specifier buffer 111 only when the Data/Specifier signal is in the specifier mode. Thus, it is appreciated that when the I/O device 13 is selected and the Device-Enable signal is High, and the Data/Specifier signal is in the specifier mode, the specifier buffer 111 is enabled to convey the specifier code from the specifier counter 108 to the I/O data bus 33.

The interface isolation circuit 20 also includes a data buffer 113 enabled by the output of an AND gate 114. In a manner similar to that described above with respect to the AND gate 112 which enables the specifier buffer 111, the AND gate 114 receives as inputs the signal from the comparator 105, the Device-Enable signal and the Data/Specifier signal from the control sequencer 37. Unlike the AND gate 112, the Data/Specifier signal is applied to the AND gate 114 through a non-inverting input thereof. Thus, the AND gate 114 enables the data buffer 113 when the local device code on the bus 100 matches the device code on the bus 97, the Device-Enable signal is High and the Data/Specifier signal is in the data mode. The data buffer 113, when enabled, couples the data port 101 of the I/O device 13 to the I/O data bus 33. The direction of data flow through the buffer 113 is controlled by the Input/Output signal on the line 99 from the I/O device 13 applied to the direction input of the buffer 113.

Thus, it is appreciated that when the Data/Specifier signal is in the specifier mode, the specifier buffer 111 is enabled and the data buffer 113 is disabled thereby placing the specifier code from the counter 108 on the I/O data bus 33. When the Data/Specifier signal is in the data mode, the data buffer 113 is enabled and the specifier buffer 111 disabled thereby coupling the data port 101 of the I/O device 13 to the I/O data bus 33. The data buffer 113 functions as a gate to control transfer of data between the I/O memory 30 and the I/O device 13.

The I/O Device Address Mapping ROM 35 contains the address and control parameters for each of the I/O devices such as the device 13. The device code on the bus 97 and the specifier code on the I/O data bus 33 are applied to the address port of the ROM 35 to select a unique location therein associated with the I/O device identified by the device code and the particular data item thereof identified by the specifier code. The selected location in the ROM 35 contains a map address in the I/O memory 30 for storing the particular data item of the particular I/O device. The map address is provided by the ROM 35 to a latch 115. The latched map address is applied to the I/O address bus 34 for accessing the I/O memory 30 via a buffer 116.

The accessed location of the ROM 35 also contains a Read/Write control signal in accordance with whether the I/O device being pulled is an input device or an output device. If the associated I/O device is an input device, the Read/Write control signal provides Write control. If the I/O device is an output device, the Read/Write control signal provides Read control. The Read/Write control signal from the memory 35 is applied to a latch 117 which applies the Read/Write latched discrete control signal to the I/O controller memory control line 46 through a buffer 118, to configure the I/O memory 30 for reading or writing in accordance with the type of I/O device being polled.

The accessed location of the ROM 35 also includes a discrete signal for clearing the specifier counter 108 when the data item denoted by the specifier code is the last data item in the complement of data items associated with the I/O device identified by the device code. This discrete is applied to a latch 119 and then to the line 110 through a buffer 120 and an AND gate 121 for clearing the counter 108 when the last data item for the polled I/O device has been processed. The AND gate 121 is enabled by the signal from the comparator 105 so that only the specifier counter 108 associated with the I/O device being polled is cleared by the signal provided by the buffer 120. The buffers 116, 118 and 120 are enabled by the Device-Enable signal from the control sequencer 37 and the latches 115, 117 and 119 are clocked by the Data/Specifier signal from the control sequencer 37. When the Data/Specifier signal is switched from the specifier mode to the data mode the rising edge of the waveform clocks the data from the ROM 35 into the latches.

In order to prevent erroneous control of the plurality of isolation circuits connected to the I/O controller, the latches 115, 117 and 119 are cleared when the Data/Specifier signal changes from the data mode to the specifier mode. The falling edge of the waveform provides this clearing function.

During an I/O device data transaction, the I/O data bus 33 performs two functions. When the Data/Specifier control signal is in the specifier mode, the I/O data bus 33 conveys the specifier information from the specifier counter 108 which uniquely identifies the item of data from the polled I/O device that will appear on the data bus 33 when the Data/Specifier signal changes to the data mode. The specifier information on the bus 33 combined with the device code on the bus 97 form the address to the mapping ROM 35. The map address output from the ROM 35 is provided to the I/O address bus 34 for defining the location in the I/O memory 30 associated with the data item of the polled I/O device. This address is placed on the I/O address bus 34 via the latch 115 by the rising edge of the Data/Specifier signal as it changes to the data mode. The data buffer 113 which has now been enabled, couples the I/O data bus 33 to the data port 101 of the polled I/O device. Thus in the data portion of the transaction, the data bus 33 carries the data item corresponding to the address generated during the specifier portion. The I/O memory is configured for reading or writing by the Read/Write discrete provided by the latch 117. It is appreciated that the I/O memory address for an I/O device is always generated by the mapping ROM 35 and never directly by the I/O device. If the polled I/O device is an input device, the data placed on the data bus 33 by the I/O device is stored in the location of the memory 30 defined by the ROM 35. If the selected I/O device is an output device, the mapping ROM 35 selects the appropriate address in the memory 30 for transfer of data from the memory 30 to the data bus 33 for acquisition by the selected I/O device. The Select-Next-Device signal increments the device counter 96 in preparation for a data transaction opportunity for the next I/O device. Simultaneously, the Select-Next-Device signal increments the specifier counter 108 to identify the next data item in the complement of data items associated with the I/O device 13. The processors 11 and 12 address the I/O memory 30 directly rather than being mapped by the mapping ROM 35. For the I/O devices an address provided by the mapping ROM 35 is uniquely associated with a specific data item of a specific I/O device.

As discussed above, the I/O devices of the system are serviced utilizing a circular polling technique. During each data transfer scan of the system, all of the I/O devices are sequentially polled to determine if access thereby is requested to the I/O memory 30 and in addition, the processors 11 and 12 are provided access to the memory 30 for the data transfer transactions required thereby. A governor counter 122 is included to ensure that the data transaction activities of the processors 11 and 12 do not occupy the data transaction cycle to the extent that sufficient time is not available to service all of the I/O devices. The governor counter 122 sets a limit on the access time for processor data transactions in the interval between providing each I/O device the opportunity to perform a data transfer transaction with respect to the I/O memory 30. The governor counter 122 ensures that the time required to service all the I/O devices is available even in the presence of extensive processor data transfer activity.

An OR gate 123 receives the CPU 1-Enable and the CPU 2-Enable signals from the control sequencer 37 and provides an enabling signal to the counter 122 whenever the CPU 1-Enable signal or the CPU 2-Enable signal is High. Thus, the counter 122 counts continuously while the processors 11 and 12 are enabled. The maximum count signal on the line 98 from the device counter 96 provides a clearing input to the counter 122. Thus the governor counter 122 is cleared whenever the device counter 96 attains maximum count indicating that all of the I/O devices have been polled. The maximum count output from the counter 122 is applied via an AND gate 124 to inverting inputs of the AND gates 64 and 84. As previously described, the AND gates 64 and 84 transmit the CPU 1-Request and the CPU 2-Request signals respectively to the control sequencer 37. If the counter 122 has not attained its maximum count, the output of the AND gate 124 is Low thereby enabling the AND gates 64 and 84 for transmission of the CPU request signals therethrough. If, however, the governor counter 122 attains the maximum count, the maximum time limit established for processor activity during the cycle has been reached. When the maximum count of the counter 22 is attained, and the Device-Enable signal is high, the AND gate 124 disables the AND gates 64 and 84 blocking transmission of the processor request signals to the control sequencer 37. Thus, when the time limit established by the governor counter 122 is attained, further processor data transactions are blocked until a complete scan of all of the I/O devices has been completed. The AND gate 124 is utilized such that a processor data transaction in progress will not be terminated but subsequent processor accesses will be delayed.

Thus, the governor counter 122 limits the net amount of I/O controller data access time accumulatively available to the processors 11 and 12. Between the beginning and end of each complete I/O controller scan of all I/O device requests, the amount of time allowed for processor data access is bounded. This guarantees the minimum data transfer rate necessary for all I/O devices regardless of the number of processors utilized in the channel, the processor short term I/O data demands or the fault status of a processor. Exceeding the limit established by the governor counter 122 is not considered as a fault but instead further processor I/O data access is suspended until the scan of all of the I/O device data access requests have been completed. After the scan has been completed the device counter 96 having attained its maximum count clears or resets the governor counter 122 so that processor access to the I/O memory 30 is resumed on the next scan.

The operation of the governor counter 122 is unlike the CPU limiter counters 72 and 92 in that when either the processor 11 or the processor 12 occupies the I/O controller for a time longer than the limit established by the counters 72 and 92 respectively, the processor is considered faulted and disabled from any further access to the I/O memory 30.

Figure 4:
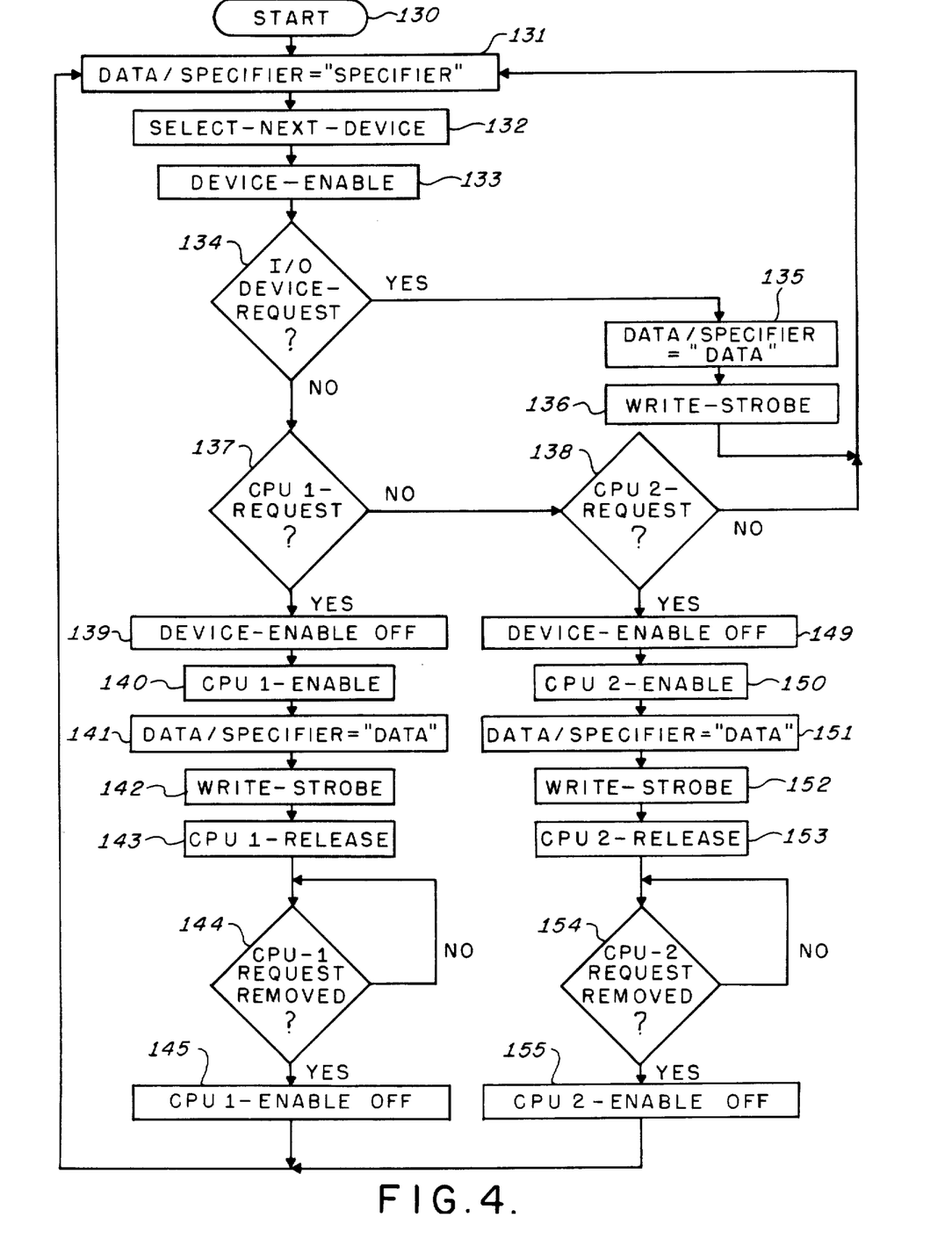
FIG. 4 is a flow chart illustrating the I/O control sequence of the channel of FIG. 2.

Referring to FIG. 4, the flow chart for the operation of the channel of FIG. 2 is illustrated. Although the program is performed cyclically, the program may be considered as beginning at a start block 130. The states of the control sequencer 37 define the control sequence flow illustrated in FIG. 4. In a particular state of the control sequencer 37, depicted by a block 131, the ROM 38 provides a data word which is latched into the latch assembly 39 with the Data/Specifier bit set to binary ZERO thereby placing the Data/Specifier signal into the specifier mode. As previously described, the specifier mode of the Data/Specifier signal is used to enable the specifier buffer 111 and disable the data buffer 113 of the I/O device whose local device code matches the device code provided by the device counter 96. The specifier mode of the Data/Specifier signal also disables the AND gate 47 which effectively configures the I/O memory 30 into the writing mode. During this state of the control sequencer 37, depicted by the block 131, the Write-Strobe signal is not issued and therefore the I/O memory 30 is not affected in this state. The data word provided by the ROM 38 and latched into the latch assembly 39 during the state depicted by the block 131 contains the ROM 38 address for the next state. This next state address is conveyed by the bus 40 to the address port of the ROM 38 which, in response thereto, provides the data word for the next state to the input of the latch assembly 39. At the next clock pulse, this next state data word will be strobed into the latch assembly 39 to provide the control signals for the next state as well as the address for the state after that.

The state following that depicted by the block 131 is the Select-Next-Device state depicted by a block 132. In this state, the data word strobed into the latch assembly 39 has a binary ONE set into the Select-Next-Device bit and has a binary ZERO set into the Data/Specifier bit. This data maintains the Data/Specifier signal in the specifier mode and also advances the device counter 96 to the next device code and is applied to the interface isolation circuits, such as the circuit 20 to advance the specifier counter of an enabled interface isolation circuit to the next data item. The Select-Next-Device signal is also applied as discussed above to the input port 104 of the associated I/O device for synchronization purposes.

Following the state depicted by the block 132 the control sequencer 37 advances to the state depicted by a block 133 in which the Device-Enable bit from the latch assembly 39 is a binary ONE, the Data/Specifier bit is a binary ZERO for maintaining this signal in the specifier mode and the Select-Next-Device bit is returned to ZERO. The Device-Enable signal defines the portion of the DMA data transfer cycle devoted to the I/O devices. The Device-Enable signal is applied to all of the interface isolation circuits, such as the circuit 20, for providing an enabling signal thereto. The interface isolation circuit coupled to the I/O device having a local device code that matches the device code provided by the device counter 96, responds in a manner described above to the Device-Enable signal by transmitting the data request signal on the line 102 from the polled I/O device through the AND gate 107 to the device-request line 44. If all of the I/O devices have been already polled, or if no I/O device is requesting a data transaction, no data request will be transmitted to the device-request line 44.

In the state depicted by the block 133 the Device-Enable signal enables the specifier buffer 111 of a selected I/O device, such that the specifier code provided by the specifier counter 108 appears on the I/O bus 33. The device code for the selected device is provided by the device counter 96 on the bus 97. The specifier code and device code uniquely address the I/O Device Address Mapping ROM 35 to provide a map address to the latch 115 that is associated with the specified data item from the selected I/O device. The ROM 35 also provides to the latch 117 a Read/Write control signal depending on whether the selected I/O device is an input or an output device and further provides a signal to the latch 119 of the specified data item is the last data item for the selected I/O device. This data from the ROM 35 is applied at the inputs to the latches 115, 117 and 119 in preparation to being strobed therein.

The next state after that depicted by the block 133 is the I/O Device-Request Decision state depicted by a block 134. In this state, the Data/Specifier bit remains in the specifier mode, the Device-Enable bit remains in the binary ONE state and the Test-Select bits are set whereby the multiplexer 41 connects the Device-Request line 44 to the line 45 so as to alter the address of the next state in accordance with the state of the Device-Request line 44. If the I/O device polled by the device code provided by the device counter 96 is issuing a Data-Request signal, the Device-Request line 44 would then be High causing the signal on the line 45 to vary the address of the next state to be that depicted by a block 135. In this state, the Data/Specifier bit is set to binary ONE, denoting the data mode and the Device-Enable bit is maintained on. The Data/Specifier signal in that data mode disables the specifier buffer 111 and enables the data buffer 113 of the selected I/O device whereby the I/O data bus 33 is coupled to the data port 101 of the device. When the Data/Specifier signal switches from the specifier mode to the data mode, the data applied to the latches 115, 117 and 119 are clocked therein and are applied by the enabled buffers 116, 118 and 120 to address the I/O memory 30, control the Read/Write configuration thereof and clear the specifier counter 108 if the data item is the last data item, respectively.

The next state following the block 135 state is the issuance of the Write-Strobe signal depicted by a block 136. In the block 136 state, the Write-Strobe bit from the latch assembly 39 is set to binary ONE, the Data/Specifier signal remains in the data mode and the Device-Enable signal remains on. Thus, if the selected I/O device is an input device, the data provided thereby is written into the location of the I/O memory 30 selected by the address on the I/O address bus 34. If the I/O device is an output device, the data in the location of the I/O memory 30 accessed by the address on the I/O address bus 34 is transmitted through the data buffer 113 to the device. It is appreciated that in the block 136 state, the Write Protect Decode Logic 50 issues the Write-Pulse in response to the Write-Strobe signal since neither CPU 1-Enable nor CPU 2-Enable is on. The Write-Control 95 prohibitions are not in effect in data transactions with the I/O devices.

The next state address for the block 136 is that of the block 131 state so that after the polled I/O device has completed its data transaction, the program loops back to the block 131 so as to poll the next I/O device. When entering the block 131 state from the block 136 state, the Write-Strobe bit is off and the Device-Enable bit is on. In the block 131 state, the Data/Specifier bit is set to the specifier mode which is designated by binary ZERO. The falling edge of the Data/Specifier signal when it switches from the data mode to the specifier mode clears the latches 115, 117 and 119.

It is thus appreciated that by continuously traversing the loop formed by blocks 131-136, all of the I/O devices are sequentially polled for data transactions with the I/O memory 30.

If, when in the block 134 state, the Device-Request line 44 is Low, signifying that there are not data requests from any I/O devices, the concommitant signal on the line 45 controls following the block 140 state is depicted by a block 41. In the block 141 state, the Data/Specifier bit is set to the data mode. In the next following state depicted by a block 142, the control sequencer 37 issues the Write-Strobe signal.

Thus, in the sequence of operations depicted by the blocks 139-142 when a CPU 1-Request is recognized, the processor 11 is coupled to the I/O data and address busses 33 and 34, as well as to the Read/Write control line 46 whereby the processor 11 will write into or receive data from the addressed location of the I/O memory 30. The Write Protect Decode Logic 50 will issue the Write-Pulse in response to the Write-Strobe signal only if the addressed location in the memory 30 is appropriate pursuant to the Write-Control specification 95 as discussed above with respect to the Write Protect aspects of the present invention.

After the issuance of the Write-Strobe pursuant to the block 142, the control sequencer 37 enters the CPU 1-Release state denoted by a block 143. In the block 143 state, the CPU 1-Release bit is set to binary ONE, the Data/Specifier bit is maintained in the data mode, the CPU 1-Enable signal is maintained in the binary ONE state and the Write-Strobe bit is turned off. As previously described, the CPU 1-Release signal is applied to the processor 11 via the line 66 signalling that the processor 11 should complete the data transaction and remove its request signal from the line 60.

The next state following the block 143 state is the CPU 1-Request Removed Decision state depicted by a block 144. In this state, the CPU 1-Enable bit is maintained on, the Data/Specifier bit is maintained in the data state and the CPU 1-Release bit is turned off. The Test-Select bits in the block 144 state control the multiplexer 41 to connect the line 42 to the line 45 whereby the status of the CPU 1-Request signal determines the address of the next state. If the CPU 1-Request signal is not removed from the line 42, the next address is that of the block 144 state and the control sequencer 37 the next address to be that of the CPU 1-Request Decision state depicted by a block 137. In the block 137 state, the Data/Specifier bit is in the specifier mode, the Device-Enable bit is on and the Test-Select bits control the multiplexer 41 to connect the line 42 input to the line 45 output so that the status of a CPU 1-Request will control the address of the next state. If the line 42 input to the multiplexer 41 indicates that there is no CPU 1-Request, the next state is the CPU 2-Request Decision state depicted by a block 138.

The block 138 state is similar to the block 137 state except that the Test-Select bits control the multiplexer 41 to connect the CPU 2-Request signal on the line 43 to the line 45 so as to control the next address. If the signal on the line 43 indicates that there is no request from CPU 2, then the next address is that of the block 131 to continue looking for I/O device and CPU 1 and CPU 2 requests. If either of the limiter counters 72 or 92 have attained maximum count, the associated latch 74 or 94, respectively, permanently blocks any further CPU requests from the associated processor. When this occurs, the associated decision block 137 or 138 permanently bipasses processing for that CPU by continuously utilizing the "NO" branch from the block. If, however, the governor counter 122 attains maximum count, the requests from both CPU 1 and CPU 2 are blocked and the "NO" branch from blocks 137 and 138 are taken until the governor counter 122 is cleared.

When the control sequencer 37 is in the block 137 state, and the processor 11 is issuing a CPU 1-Request signal on the line 60, and this signal is propagated through the AND gates 62 and 64 to the line 42, the next state is entered depicted by a block 139. In this state, the Device-Enable bit is turned off and the Data/Specifier signal is maintained in the specifier mode. During the next following state, depicted by a block 140, the CPU 1-Enable bit is set High. This enables the buffers 68, 70 and 71 as previously described. The next state remains in this state. When the CPU 1-Request signal is removed from the line 42, the next address becomes that of the CPU 1-Enable off state denoted by a block 145.

As previously described, it is appreciated that if because of a hardware or software fault or error in the processor 11 that results in the CPU 1-Request signal not being removed, the control sequencer 37 will remain locked into a continuously waiting state thereby preventing any further data transactions. As described, the limiter counter 72 prevents this from occurring by disabling the AND gate 62 thereby removing the CPU 1-Request signal from the line 42.

In the block 145 state, the CPU 1-Enable bit is turned off and the Data/Specifier bit is maintained in the data mode. The next address for the block 145 state controls the sequencer 37 to return to the block 131 state.

In a manner similar to that described with respect to the block 137 state, the block 138 state leads to a series of blocks 149-155 that control a sequence of signals and operations for the processor 12 in a manner identical to that described with respect to the blocks 139-145, respectively.

It will be appreciated from the foregoing that the I/O controller of FIG. 2 establishes a fault and error boundary with respect to the processors 11 and 12 and with respect to the I/O devices. The I/O data is independently available to the processors 11 and 12 via the Write-Protected I/O memory 30. One of the processors cannot contaminate the access to data by the other processor and cannot effect the ability of the other processor to process the data. The I/O controller provides data access isolation with respect to the processors 11 and 12 and with respect to the I/O devices. As discussed above, the processors 11 and 12 may utilize dissimilar data processinig with cross processor monitoring to detect generic faults or design errors. The independent, isolated and uncontaminated acess for each processor to the same data, necessary for the cross processor monitoring integrety, is provided by the I/O controller of the present invention. The I/O control system operates independently and autonomously with respect to the processors 11 and 12 as well as with respect to the I/O devices. The processors 11 and 12 communicate with the I/O controller via buffers that are controlled by the I/O controller. The limiters 72 and 92 limits the access time by the processors 11 and 12 to the I/O memory 30 assuring minimum access delays to a processor while guarantying that a fault in a processor cannot affect access to the memory 30 by the other processor. Excessive data transaction time from a faulted processor is prevented by the time limitation established by the counters 72 and 92, thereby assuring that a faulted processor will not interfere with a non-faulted processor. The limiters 72 and 92 provide fault isolation with respect to the processors 11 and 12.

Additionally, the governor technique discussed above with respect to the governor counter 122 guarantees that activities of the processors 11 and 12 cannot disrupt I/O device access to the I/O memory 30.

As discussed above, in prior art systems the I/O devices exercise direct control over the system data address and control busses. A random failure or generic fault in an I/O device can result in enabling or disabling bus components in an irregular manner. The I/O device failure or fault can also result in a system malfunction such as causing an erroneous interrupt. Data provided by critical I/O devices can thereby be contaminated by non-critical devices. The faulted or failed I/O device can result in total system failure. The fault in the I/O device may be in the device itself or in the I/O conversion electronic circuitry associated therewith. In the absence of the present invention, it was necessary to analyze each I/O device and conversion circuitry for faults that would disrupt bus and system activity to the probability required for critical I/O devices. Detailed analysis of all elements critical and non-critical connected to the system bus was required.

In accordance with the invention, the interface isolation circuits associated with the respective I/O devices create a boundary such that no random failure or design fault of an I/O device can disrupt the DMA controller or affect another I/O device. Thus, non-critical I/O devices are prevented from contaminating critical functions regardless of their failure modes or design faults. Therefore, only the flight critical I/O devices need be analyzed for the absence of faults to the level required by the Federal Air Regulations for flight critical components. A failure of a non-critical I/O device results in nothing more serious than erroneous, non-critical data being entered into or read from a location of the I/O memory 30 reserved for the data item of the I/O device. The data is written into or read from the correct address since the address is allocated to the data item of the I/O device by the mapping ROM 35. Thus, a fault or failure in an I/O device can only affect the contents of the memory location 30 dedicated to the faulted deviced and this location will only contain non-critical data. Additionally, since the DMA controller polls the I/O devices via the device counter 96, the cycling through the I/O devices will continue irrespective of a faulted I/O device.

The interface isolation circuit contains all of the control signals for the I/O device associated therewith. The isolation circuit provides the specifiers for the data items and performs the comparison between the I/O device local device code and the device code provided by the DMA controller. The I/O device communicates to the isolation circuit that it is ready for a data transfer and requests data transfer access to the DMA controller. There isn't anything on the I/O device that can affect the data addresses or disrupt the over-all operation of the system. Any failure mode which could disrupt the enire system is exclusively associated with the interface isolation circuit.

The interface isolation circuits embody a standardized interface protocol for coupling I/O devices to the DMA controller. All control and communication of an I/O device with the central I/O controller is through the interface isolation circuit. Thus, the isolation circuit greatly simplifies the task of interfacing an I/O device to the DMA control unit bus by providing all of the necessary interface signals. The invention facilitates adding additional I/O devices to a system in that only newly added critical devices must be analyzed to a critical level. In the absence of the invention, an added device that is non-critical would be analyzed to the critical level. In the absence of the invention, merging of critical and non-critical I/O devices was not readily achieved.

The design of the DMA controller including the interface isolation circuits is simple enough to permit the controller to be readily analyzed for the absence of generic faults and random failures by traditional failure mode and effects analysis techniques to the level required for critical functionality. The complexity of the I/O controller including the interface isolation circuits is minimized to permit traditional analysis with respect to their specific fault characteristics. The controller and isolation circuits exhibit predictable failure modes. Only failure of the controller and isolation circuits can cause total system disruption. The invention provides a flexible data handling system capable of interfacing with multiple processors and plural I/O devices.

While the invention has been described in its preferred embodiments, it is to be understood that the words which have been used are words of description rather than limitation and that changes may be made within the purview of the appended claims without departing from the true scope and spirit of the invention in its broader asepcts.

What is claimed is:

1. A channel for an automatic flight control system comprising:
    a set of input devices,
    a set of output devices,
    a first digital processor,
    a second digital processor,
    a data control system intercoupling said set of input devices, said set of output devices, said first digital processor and said second digital processor for transferring data signals, address signals and control signals therebetween, said first digital processor having access of said data control system for a first predetermined time interval and said second digital processor having access to said data control system for a second predetermined time interval,
    first limiter means associated with said first digital processor for disabling access of said first digital processor to said data control system whenever said first digital processor maintains access thereto for a time interval greater than said first predetermined time interval,
    second limiter means associated with said second digital processor for disabling access of said second digital processor to said data control system whenever said second digital process maintains access thereto for a time interval greater than said second predetermined time interval.

2. The channel of claim 1 in which said first digital processor provides a request signal to said data control system for requesting access thereto and said data control system provides an enable signal to said first digital processor for enabling access of said first digital processor to said data control system for said first predetermined time interval and in which said first limiter means comprises
    counter means enabled by said enable signal for providing a first timing interval corresponding to said first predetermined time interval,
    latch means responsive to said counter means for providing a disabling signal when said counter means attains said first timing interval, and
    gate means responsive to said disabling signal and said request signal for blocking transmission of said request signal when said latch means provides said disabling signal.

3. The channel of claim 1 in which said control system operates in iterative data communication cycles, said set of input and output devices are sequentially polled during each cycle, and in which said data control system includes governor means for suppressing access of said first and second digital processors to said data control system when said first and second processors have had access to said data control system during a data communication cycle for a time which exceeds a third predetermined time interval, said governor means effecting said suppression until all of said input and output devices have been polled and have had access to said data control system.

4. The channel of claim 3 in which each said first and second digital processor provides a request signal to said data control system for requesting access thereto and said data control system provides enable signals to said first and second digital processors for enabling access thereof, respectively, to said data control system, said governor means comprising
    a governor counter responsive to said enable signals for providing a third predetermined time interval during which said first and second digital processors have access to said data control system, and gate means responsive to said governor counter and to said request signals for blocking said request signals when said governor counter attains said third predetermined time interval.

5. The channel of claim 4 in which said data control system includes a device counter for providing a sequence of device code signals corresponding to said input and output devices, respectively, said device counter providing a maximum count signal when said device counter has counted through a complete sequence of said device codes, said maximum count signal being coupled to said governor counter for clearing said governor counter.

6. The channel of claim 1 in which said data control system comprises a bus intercoupling said set of input devices, said set of output devices, said first digital processor and said second digital processor for conveying data signals, address signals and control signals therebetween, and memory means coupled to said bus or receiving data from and providing data to said first digital processor, said second digital processor, said set of input devices and said set of output devices via said bus, and said data control system comprising a direct memory access (DMA) system with respect to said memory means.

7. The channel of claim 6 in which said DMA system includes a device counter for providing a sequence of device code signals corresponding to said input and output devices, respectively, and a plurality of interface isolation circuits, respectively responsive to said device code signals, coupling said input and output devices to said bus so as to prevent a fault that occurs in an input or output device from propagating into said channel except for erroneous data being entered into a location of said memory assigned to said device having said fault.

8. The channel of claim 7 in which each said input and output device provides a local device code signal, designating said device, to the interface isolation circuit associated therewith, and each said interface isolation circuit includes comparator means responsive to the device code signals from said device counter and to the local device code signal from the input or output device associated therewith for providing an enabling signal to said interface isolation circuit when one of said device code signals matches said local device code signal.

9. The channel of claim 8 in which each said interface isolation circuit includes specifier generator means for providing a sequence of specifier signals corresponding to the data items, respectively, associated with the input or output device coupled to said interface isolation circuit, and specifier buffer means, enabled in response to said enabling signal and responsive to said specifier signals, for conveying said specifier signals to said bus.

10. The channel of claim 9 in which each said interface isolation circuit includes data buffer means, enabled in response to said enabling signal, for coupling data signals between the input or output device associated therewith and said bus.

11. The channel of claim 9 in which said DMA system further includes address mapping means responsive to said device code signals and to said specifier signals for providing a map address signal in accordance with the device code signal and the specifier signal applied thereto for addressing said memory means to access a location therein reserved for the data item from the input or output device designated by said specifier signal and device code signal.

12. The channel of claim 6 in which said memory means comprises first and second memory sections associated with said first and second digital processors, respectively, so that only said first digital processor can write into said first memory section and only said second digital processor can write into said second memory section.

13. The channel of claim 12 in which DMA system includes write-protection circuit means coupled to said memory means for preventing said first digital processor from writing into said second memory section and said second digital processor from writing into said first memory section in accordance with address signals conveyed from said first and second digital processors.

14. The channel of claim 13 in which said memory means includes a third memory section into which neither said first nor said second digital processor can write.

15. The channel of claim 14 in which said DMA system is so constructed and arranged as to write the same data item into plural sections of said memory means.

16. The channel of claim 6 in which said DMA system provides enable signals to said first and second digital processors, respectively, said DMA system further including buffer means coupling said first and second digital processors to said bus, said enable signals being coupled to said buffer means for enabling said buffer means.

17. The channel of claim 6 in which said DMA system further includes sequencer means for sequentially providing access to said bus means for each of said input and output devices and said first and second digital processors.

18. The channel of claim 1 further including first and second buffers coupled respectively between said first and second digital processors and said data control system and wherein said first and second digital processors utilize dissimilar data processing and cross processor monitoring to detect generic faults.

* * * * *